(12) United States Patent
Branavan et al.

(10) Patent No.: US 10,210,244 B1
(45) Date of Patent: Feb. 19, 2019

(54) UPDATING NATURAL LANGUAGE INTERFACES BY PROCESSING USAGE DATA

(71) Applicant: ASAPP, INC., New York, NY (US)

(72) Inventors: Satchuthananthavale Rasiah Kuhan Branavan, London (GB); Joseph Ellsworth Hackman, Rego Park, NY (US); Frederick William Poe Heckel, New York, NY (US); Aaron Isaksen, Brooklyn, NY (US)

(73) Assignee: ASAPP, INC., New York, NY (US)

( * ) Notice: Subject to any disclaimer, the term of this patent is extended or adjusted under 35 U.S.C. 154(b) by 0 days.

(21) Appl. No.: 15/894,504

(22) Filed: Feb. 12, 2018

(51) Int. Cl.
*G06F 17/27* (2006.01)
*G06F 17/30* (2006.01)
*G06Q 30/00* (2012.01)
*G06N 3/02* (2006.01)

(52) U.S. Cl.
CPC .... *G06F 17/30654* (2013.01); *G06F 17/2785* (2013.01); *G06F 17/30705* (2013.01); *G06N 3/02* (2013.01); *G06Q 30/016* (2013.01)

(58) Field of Classification Search
CPC ....................................................... G06F 17/30
USPC .................................. 704/9; 726/5; 715/769
See application file for complete search history.

(56) References Cited

U.S. PATENT DOCUMENTS

| | | | |
|---|---|---|---|
| 5,195,034 A | 3/1993 | Garneau et al. | |
| 5,227,971 A | 7/1993 | Nakajima et al. | |
| 5,369,575 A | 11/1994 | Lamberti et al. | |
| 6,173,279 B1 | 1/2001 | Levin et al. | |
| 6,381,645 B1 | 4/2002 | Sassin et al. | |
| 6,453,292 B2 | 9/2002 | Ramaswamy et al. | |
| 6,915,254 B1 | 7/2005 | Heinze et al. | |

(Continued)

FOREIGN PATENT DOCUMENTS

| WO | 2018009231 A1 | 1/2018 |
|---|---|---|
| WO | 2018009432 A1 | 1/2018 |

OTHER PUBLICATIONS

"scikit-learn: Machine Learning in Python", scikit-learn 0.17.1 documentation, http://scikit-learmorg/stable/ (accessed on Sep. 20, 2016), 3 pages.

(Continued)

*Primary Examiner* — Michael C Colucci
(74) *Attorney, Agent, or Firm* — GTC Law Group PC & Affiliates

(57) ABSTRACT

A third-party company may assist companies in providing natural language interfaces for their customers. To implement a natural language interface for a company, a configuration may be received that includes information, such as a list intents, seed messages for the intents, and hierarchical information of the intents. An intent classifier may be trained using the configuration, and the natural language interface may be deployed for use with customers. Usage data of the natural language classifier may be collected and used to improve the natural language interface. Messages corresponding to an intent may be clustered into clusters of similar messages, and a prototype message may be obtained for each cluster to provide a human understandable description of the cluster. The information about the clusters may be used to improve the natural language interface, such as by creating a new intent with a cluster or moving a cluster to a different intent.

22 Claims, 13 Drawing Sheets

| Cluster | Prototype | Count | Success rate |
|---|---|---|---|
| 1 | I need to change my address | 7,912 | 97% |
| 2 | I moved | 872 | 88% |
| 3 | I have a new address | 1,527 | 93% |
| 4 | My address is wrong | 305 | 74% |
| 5 | I'm away on vacation | 539 | 11% |
| ... | ... | ... | ... |

(56) References Cited

U.S. PATENT DOCUMENTS

| | | | |
|---|---|---|---|
| 6,981,040 B1 | 12/2005 | Konig et al. | |
| 7,603,330 B2 | 10/2009 | Gupta et al. | |
| 7,644,057 B2 | 1/2010 | Nelken et al. | |
| 8,024,196 B1* | 9/2011 | Wodtke | H04M 3/4938 379/90.01 |
| 8,156,138 B2 | 4/2012 | Kohn et al. | |
| 8,271,403 B2 | 9/2012 | Rieck et al. | |
| 8,577,671 B1 | 11/2013 | Barve et al. | |
| 8,626,509 B2 | 1/2014 | Roy et al. | |
| 9,336,269 B1 | 5/2016 | Smith et al. | |
| 9,715,496 B1 | 7/2017 | Sapoznik et al. | |
| 9,723,151 B2* | 8/2017 | McGann | G06N 99/00 |
| 9,762,733 B1* | 9/2017 | Ramanujaiaha | H04M 3/5183 |
| 9,805,371 B1 | 10/2017 | Sapoznik et al. | |
| 9,807,037 B1 | 10/2017 | Sapoznik et al. | |
| 10,049,663 B2* | 8/2018 | Orr | G06F 17/30026 |
| 10,067,938 B2* | 9/2018 | Bellegarda | G06F 17/289 |
| 10,083,690 B2* | 9/2018 | Giuli | G10L 15/22 |
| 10,089,072 B2* | 10/2018 | Piersol | G06F 3/167 |
| 2003/0033288 A1 | 2/2003 | Shanahan et al. | |
| 2004/0254904 A1 | 12/2004 | Nelken et al. | |
| 2005/0105712 A1 | 5/2005 | Williams et al. | |
| 2005/0228790 A1 | 10/2005 | Ronnewinkel et al. | |
| 2006/0112127 A1 | 5/2006 | Krause et al. | |
| 2006/0173776 A1 | 8/2006 | Shalley et al. | |
| 2007/0094217 A1 | 4/2007 | Ronnewinkel et al. | |
| 2007/0100618 A1 | 5/2007 | Lee et al. | |
| 2007/0168448 A1 | 7/2007 | Garbow et al. | |
| 2008/0091435 A1 | 4/2008 | Strope et al. | |
| 2008/0168070 A1 | 7/2008 | Naphade et al. | |
| 2011/0066634 A1* | 3/2011 | Phillips | G10L 15/22 707/769 |
| 2011/0082825 A1 | 4/2011 | Sathish et al. | |
| 2011/0286596 A1 | 11/2011 | Gressel et al. | |
| 2011/0314012 A1 | 12/2011 | Kenthapadi et al. | |
| 2012/0005515 A1 | 1/2012 | Reddi et al. | |
| 2012/0053945 A1 | 3/2012 | Gupta et al. | |
| 2013/0143587 A1* | 6/2013 | Williams | H04W 4/023 455/456.1 |
| 2013/0144605 A1* | 6/2013 | Brager | G06F 17/28 704/9 |
| 2013/0166485 A1 | 6/2013 | Hoffmann et al. | |
| 2013/0317808 A1 | 11/2013 | Kruel et al. | |
| 2014/0075004 A1 | 3/2014 | Van Dusen et al. | |
| 2014/0282138 A1 | 9/2014 | Hopton et al. | |
| 2014/0297281 A1 | 10/2014 | Togawa et al. | |
| 2014/0317030 A1 | 10/2014 | Shen et al. | |
| 2014/0330818 A1 | 11/2014 | Raina et al. | |
| 2015/0006143 A1 | 1/2015 | Skiba et al. | |
| 2015/0032724 A1 | 1/2015 | Thirugnanasundaram et al. | |
| 2015/0052002 A1 | 2/2015 | Welch et al. | |
| 2015/0073798 A1* | 3/2015 | Karov | G10L 15/197 704/245 |
| 2015/0142704 A1 | 5/2015 | London | |
| 2015/0149177 A1* | 5/2015 | Kalns | G10L 15/1822 704/257 |
| 2015/0215624 A1 | 7/2015 | Wei | |
| 2015/0228275 A1 | 8/2015 | Watanabe et al. | |
| 2015/0242385 A1* | 8/2015 | Bao | G06F 17/2881 704/9 |
| 2015/0310377 A1 | 10/2015 | Duval et al. | |
| 2015/0363393 A1 | 12/2015 | Williams et al. | |
| 2015/0365387 A1 | 12/2015 | Good | |
| 2016/0063067 A1* | 3/2016 | Maitra | G06F 17/30011 707/734 |
| 2016/0092688 A1 | 3/2016 | Wolrich et al. | |
| 2016/0163311 A1 | 6/2016 | Crook et al. | |
| 2016/0163314 A1 | 6/2016 | Fujii et al. | |
| 2016/0180151 A1 | 6/2016 | Philbin et al. | |
| 2016/0182672 A1 | 6/2016 | Kuperman et al. | |
| 2016/0247068 A1 | 8/2016 | Lin | |
| 2016/0364522 A1 | 12/2016 | Frey et al. | |
| 2017/0011279 A1 | 1/2017 | Soldevila et al. | |
| 2017/0116982 A1* | 4/2017 | Gelfenbeyn | G10L 15/1815 |
| 2017/0148073 A1* | 5/2017 | Nomula | G06Q 30/0617 |
| 2018/0012231 A1 | 1/2018 | Sapoznik et al. | |
| 2018/0012232 A1 | 1/2018 | Sehrawat et al. | |
| 2018/0013699 A1 | 1/2018 | Sapoznik et al. | |
| 2018/0052664 A1* | 2/2018 | Zhang | G06F 8/34 |
| 2018/0174037 A1 | 6/2018 | Henry | |
| 2018/0174579 A1 | 6/2018 | Henry | |
| 2018/0181807 A1* | 6/2018 | Yankov | G06K 9/00476 |
| 2018/0232434 A1* | 8/2018 | Geyik | G06F 17/30648 |
| 2018/0239830 A1* | 8/2018 | Dialani | G06Q 50/01 |

OTHER PUBLICATIONS

"Using algorithms for advanced customer care", Nokia Strategic white paper, https://resources.ext.nokia.com/asset/200614 (accessed Jul. 26, 2017), 2017, 11 pages.

U.S. Appl. No. 15/789,241, "U.S. Appl. No. 15/789,241, filed Oct. 20, 2017", 51 pages.

Al-Rfou, et al., "Conversational Contextual Cues: The Case of Personalization and History for Response Ranking", CoRR abs/1606.00372, http://arxiv.org/abs/1606.00372, 2016, 10 pages.

Bahdanau, et al., "Neural Machine Translation by Jointly Learning to Align and Translate", CoRR abs/1409.0473, http://arxiv.org/abs/1409.0473, May 19, 2016, 15 pages.

Bengio, et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Blei, et al., "Latent Dirichlet Allocation", Journal of Machine Learning Research, vol. 3, 2003, pp. 993-1022.

Brown, et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Carrier, et al., "LSTM Networks for Sentiment Analysis", http://deeplearning.net/tutorial/lstm.html, accessed on Sep. 20, 2016, 5 pages.

Chen, et al., "An empirical investigation of sparse log-linear models for improved dialogue act classification", 2013 IEEE International Conference on Acoustics. Speech and Signal Processing. IEEE., 2013, 6 pages.

Chen, "An empirical investigation of sparse log-linear models for improved dialogue act classification.", 2013 IEEE International Conference on Acoustics, Speech and Signal Processing. IEEE, 2013, pp. 1-6.

Courbariaux, et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

Deerwester, et al., "Indexing by Latent Semantic Analysis", Journal of the Association for Information Science and Technology, vol. 41, iss. 6, Sep. 1990, pp. 391-407.

Gong, et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.

Hochreitner, et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.

Iyyer, et al., "Deep Unordered Composition Rivals Syntactic Methods for Text Classification", Association for Computational Linguistics (ACL), http://cs.umd.edu/~miyyer/pubs/2015_acl_dan.pdf, 2015, 11 pages.

Ji, et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.

Karpathy, "The Unreasonable Effectiveness of Recurrent Neural Networks", http://karpathy.github.io/2015/05/21/rnn-effectiveness/, (accessed on Sep. 20, 2016), May 21, 2015, 42 pages.

Kim, et al., "Character-Aware Neural Language Models", CoRR abs/1508.06615, http://arxiv.org/abs/1508.06615, 2015, 9 pages.

(56) References Cited

OTHER PUBLICATIONS

Kim, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.
Kiros, et al., "Skip-Thought Vectors", Proceedings of the 28th International Conference on Neural Information Processing Systems, vol. 2., 2015, pp. 3294-3302.
Lai, et al. "Recurrent Convolutional Neural Networks for Text Classification", AAAI'15 Proceedings of the Twenty-Ninth AAAI Conference on Artificial Intelligence, 2015, pp. 2267-2273.
Lai, et al., "Simultaneous Feature Learning and Hash Coding with Deep Neural Networks", CoRR, accessed at http://www.cv-foundation.org/openaccess/content_cvpr_2015/papers/Lai_Simultaneous_Feature_Learning_2015_CVPR_paper.pdf, 2015 (accessed Janaury 3, 2017), pp. 3270-3278.
Larochelle, et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.
Le, et al., "Distributed Representations of Sentences and Documents", Proceedings of the 31st International conference on Machine Learning, W&CP vol. 32, Beijing, China, 2014, 9 pages.
Lee, et al., "Robust Dialog Management with N-best Hypotheses Using Dialog Examples and Agenda", Proceedings of ACL-08: HLT, Columbus, Ohio, Jun. 2008, pp. 630-637.
Levy, et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.
Li, et al., "A Hierarchical Neural Autoencoder for Paragraphs and Documents", Proceedings of the 53rd Annual Meeting of the Association for Computational Linguistics and the 7th International Joint Conference on Natural Language Processing, Beijing, China, http://web.stanford.edu/~jurafsky/pubs/P15-1107.pdf, Jul. 26-31, 2015 (accessed on Jan. 3, 2017), pp. 1106-1115.
Logeswaran, et al., "An Efficient Framework for Learning Sentence Representations", International Conference on Learning Representations, https://openreview.net/pdf?id=rJvJXZb0W, 2018, 16 pages.
Miao, et al., "Neural Variational Inference for Text Processing", CoRR abs/1511.06038, http://arxiv.org/abs/1511.06038, 2015, 15 pages.
Mikolov, et al., "Distributed Representations of Words and Phrases and their Compositionality", CoRR abs/1310.4546, http://arxiv.org/abs/1310.4546, 2013, 9 pages.
Mikolov, et al., "Distributed Representations ofWords and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.
Mikolov, et al., "Recurrent neural network based language model", Interspeech 2010, Sep. 26-30, 2010, Makuhari, Chiba, Japan, 2010, pp. 1045-1048.
Mikolov, et al., "Recurrent neural network based language model", Interspeech 2010, Makuhari, Chiba, Japan, accessed at http://www.fit.vutbr.cz/research/groups/speech/publi/2010/mikolov_interspeech2010_IS100722.pdf, Sep. 26-30, 2010 (accessed on Jan 3, 2017), pp. 1045-1048.
Pagliardini, et al., "Unsupervised Learning of Sentence Embeddings using Compositional n-Gram Features", CoRR abs/1703.02507, http://arxiv.org/abs/1703.02507, Jul. 10, 2017, 11 pages.
PCT/US2016/049896, "Application Serial No. PCT/US2016/049896, International Search Report and the Written Opinion dated May 19, 2017", 14 pages.
PCT/US2017/040205, "Application Serial No. PCT/US2017/040205, International Search Report and the Written Opinion dated Sep. 15, 2017", 11 pages.
Rush, et al., "Optimal Beam Search for Machine Translation", Proceedings of EMNLP 2013, Oct. 18-21, 2013, Seattle, Washington, USA, 2013, 12 pages.
Shi, et al., "Contextual spoken language understanding using recurrent neural networks.", 2015 IEEE International Conference on Acoustics, Speech and Signal Processing (ICASSP). IEEE, 2015, pp. 5271-5275.
Sutskever, et al., "Sequence to Sequence Learning with Neural Networks", CoRR abs/1409.3215, http://arxiv.org/abs/1409.3215, 2014, 9 pages.
Tai, et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.
Vinyals, et al., "A Neural Conversational Model", CoRR abs/1506.05869, http://arxiv.org/abs/1506.05869, 2015, 8 pages.
Wang, et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.
Zhang, et al., "Character-level Convolutional Networks for Text Classification", CoRR abs/1509.01626, http://arxiv.org/abs/1509.01626, 2015, 9 pages.
Zhao, et al., "Self-Adaptive Hierarchical Sentence Model", CoRR abs/1504.05070, http://arxiv.org/abs/1504.05070, Apr. 27, 2015, 8 pages.
Deerwester, et al., "Improving Information Retrieval with Latent Semantic Indexing", Proceedings of the 51st ASIS Annual Meeting (ASIS '88), vol. 25, Oct. 1988, pp. 36-40.

\* cited by examiner

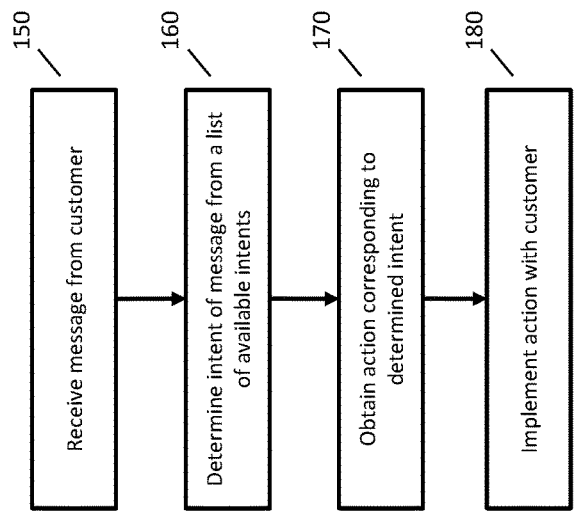
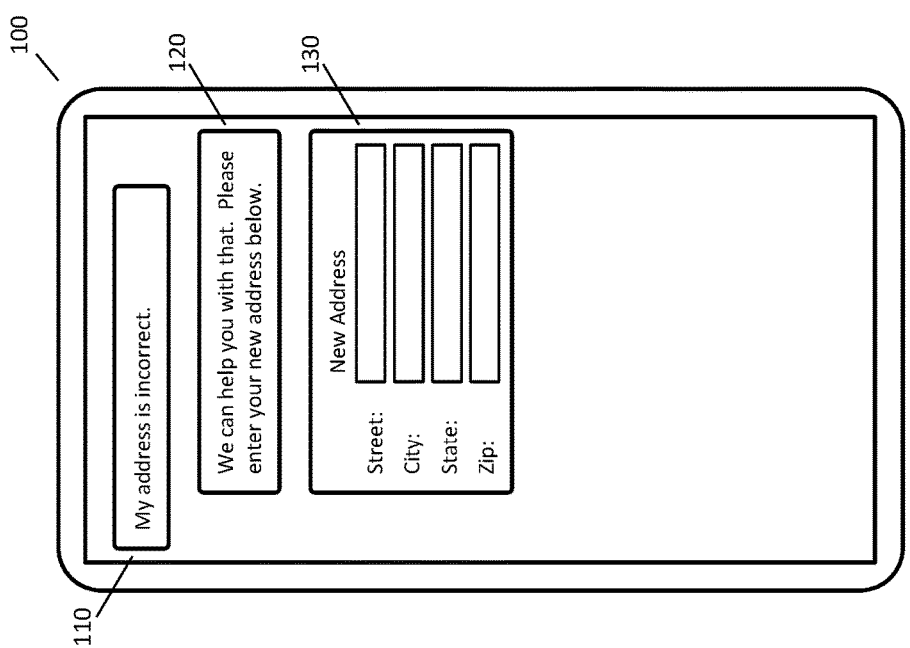
Fig. 1B
Fig. 1A

| Messages for Intent | Count | Success rate |
|---|---|---|
| I want to change my address | 1,213 | 98% |
| I need to change my address | 2,278 | 96% |
| I would like to change my address | 1,527 | 97% |
| I moved | 305 | 89% |
| I have a new address | 1,037 | 94% |
| My address is wrong | 256 | 70% |
| I'm away on vacation | 539 | 10% |
| ... | ... | ... |

Fig. 9A

| Cluster | Prototype | Count | Success rate |
|---|---|---|---|
| 1 | I need to change my address | 7,912 | 97% |
| 2 | I moved | 872 | 88% |
| 3 | I have a new address | 1,527 | 93% |
| 4 | My address is wrong | 305 | 74% |
| 5 | I'm away on vacation | 539 | 11% |
| ... | ... | ... | ... |

Fig. 9B

UPDATING NATURAL LANGUAGE INTERFACES BY PROCESSING USAGE DATA

FIELD OF THE INVENTION

The present invention relates to using semantic processing to improve customer support.

BACKGROUND

Companies need to efficiently interact with customers to provide services to their customers. For example, customers may need to obtain information about services of the company, may have a question about billing, or may need technical support from the company. Companies interact with customers in a variety of different ways. Companies may have a website and the customer may navigate the website to perform various actions. Companies may have an application ("app") that runs on a user device, such as a smart phone or a tablet, that provides similar services as a website. Companies may have a phone number that customers can call to obtain information via interactive voice response or to speak with a customer service representative. Companies may also respond to customers using various social media services, such as Facebook or Twitter.

Some existing techniques for allowing customers to interact with companies may be a nuisance to the customer. Navigating to the right page on a website or an app or navigating a voice menu on a phone call may be time consuming. Some existing techniques for allowing customers to interact with companies may be expensive for a company to implement. Hiring customer service representatives to manually respond to requests and answer phone calls may be a significant expense.

BRIEF DESCRIPTION OF THE FIGURES

The invention and the following detailed description of certain embodiments thereof may be understood by reference to the following figures:

FIG. 1A is an example user interface for a natural language interface, and FIG. 1B is a flowchart of an example implementation of the natural language interface.

FIG. 9A is an example of usage data corresponding to an intent, and FIG. 9B is an example of clustered usage data for an intent.

DETAILED DESCRIPTION

Figure 2B:
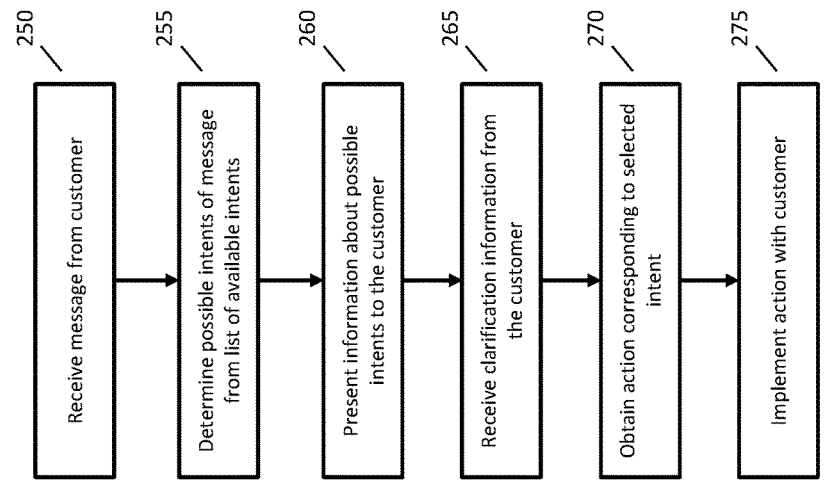
FIG. 2B is a flowchart of an example implementation of the natural language interface.

Described herein are techniques for implementing a natural language interface to respond to a request of a user. Although the techniques described herein may be used for a wide variety of users and requests, for clarity of presentation, an example of a company providing a response to a request of a customer will be used. The techniques described herein, however, are not limited to customers and companies, responses may be provided to requests from users who are not customers, and responses may be from any entity or person. The techniques described herein may use or be combined with any of the techniques described in U.S. Pat. No. 9,715,496 or U.S. patent application Ser. No. 15/789,241, each of which is incorporated herein by reference in their entireties for all purposes ("incorporated patents").

A natural language interface may be used to provide a fully automated experience for a customer. A natural language interface may use semantic processing to allow a customer to obtain needed information or needed support by making a request using natural language. The use of natural language for making requests may allow the customer to receive a resolution to his request more quickly than with other methods of making requests. In some instances, the customer's request may be resolved with a single interaction. For example, where the customer asks, "When is my package arriving?," the response may be, "Your package is scheduled to arrive on Wednesday and has tracking number 1234."

Implementing, diagnosing, and improving a natural language interface may be challenging for a company. Customers may express a concept using a wide variety of different expressions. For example, a customer wanting to change his address may state "I'd like to change my address" or "I've moved." Additionally, a company may want to handle many different types of requests, such as address changes, bill requests, refunds, requests for new services, technical support, and any other issue that may normally be handled by a human customer support representative. Between a large number of different types of requests, and a large number of ways of expressing each request, it may be challenging to implement a natural language interface that works properly for most ways of expressing each type of request. A company may desire an accurate natural language interface because it may lower costs for the company and also provide a better experience for customers of the company.

The techniques described herein improve the ability of a company to initially create a natural language interface and to later improve the natural language interface based on usage data of customers using the natural language interface. The techniques described herein allow a company to identify portions of the natural language interface that are operating well (e.g., with low error rates) and portions of the natural language interface that could be improved.

The usage data of customers using the natural language interface may include a large amount of data that may be challenging for a computer or a human to review to understand why portions of the natural language interface are working well or not. The techniques described herein include clustering the usage data into clusters of similar usage data (e.g., different ways of expressing the same request) and selecting prototype messages for each cluster. By using information about clusters of usage data and their prototype messages, the usage data may be processed more efficiently to improve the operation of the natural language interface, as described in greater detail below.

FIG. 1A illustrates an example automated customer support session on a customer device and FIG. 1B is a flowchart of an example implementation of providing automated customer support. In FIG. 1B and other flowcharts herein, the ordering of the steps is exemplary and other orders are possible, not all steps are required, steps may be combined (in whole or part) or sub-divided and, in some implementations, some steps may be omitted or other steps may be added. The methods described by any flowcharts described herein may be implemented, for example, by any of the computers or systems described herein.

In FIG. 1A, the customer has used customer device 100 to access a user interface for obtaining support from a company. Customer device 100 may be any appropriate device, such as a smart phone, tablet, wearable device, or Internet of things device. The customer may request support using any appropriate techniques, such as typing or speaking a message to an app running on the customer device (e.g., an app of the company or a third-party app created for processing customer requests), typing or speaking a message on a web page, sending a text message, or sending an email. As used herein, a text message includes any message sent as text including but not limited to a message sent using SMS (short message service) or a special-purpose application (e.g., Facebook messenger, Apple iMessage, Google Hangouts, or WhatsApp). In FIG. 1A, the customer has entered message 110 "My address is incorrect."

User interfaces described throughout the present disclosure may be of any type, including at least a mobile application, a web-based interface, a texting interface (e.g., receipt, responses, and/or prompts via text), a dedicated program operating on a computer, and/or any hardware device, computer executable media, and/or display accessible to customers, customer service representatives, and/or company agents or representatives. User interfaces include any display devices configured to depict elements of the user interface, and/or input/output devices configured to receive responses from users of any aspect of embodiments described herein. Without limitation, user interfaces include, in certain embodiments, one or more of network communications, graphical displays, mobile devices, keyboards, mouses, and/or touch screens. In certain embodiments, the same or distinct, or re-configured, user interfaces may be provided to various users in an embodiment of the disclosure. For example, a first user interface may be provided to a user for training a natural language interface, a second user interface may be provided to a user (e.g., at a first company) for data collection or display about a natural language interface (e.g., displaying cluster information), a third user interface may be provided to a user (e.g., at a second company) for training and/or data collection or display about a second natural language interface, and a fourth user interface may be provided to a customer for obtaining support from a company (e.g., the first company, the second company, or another company). The number of user interface examples is provided to distinguish user interfaces, and does not imply any order or relationship between the interfaces. Any given interface infrastructure (e.g., computer executable media operating on a server, and/or network communications) may be utilized in one or more interfaces, and any one or more of the example user interfaces may be present or not present in given embodiments.

At step 150 of FIG. 1B, a company receives the message of the customer. At step 160, the company processes the message to determine an intent of the message. For example, the company may process the message with an intent classifier that provides a score for each intent of a list of available intents, and an intent having a highest score may be selected as the intent of message 110. At step 170, the company obtains an action corresponding to the determined intent of message 110. An action may correspond to any sequence of interactions defined by the company. For example, an action may correspond to launching an application with the user (e.g., to change an address), providing a message to the user with requested information, directing the user to a resource (e.g., a web page), or connecting the user with a customer service representative. In this example, the selected action corresponds to launching an application with the user to change the user's address. At step 180, the action is implemented with the user.

The term intent, as used herein should be understood broadly and any appropriate intents may be used. For example, an intent may include a user intent to acquire assistance with a problem (e.g., assistance with a malfunctioning product or reduction in service), to make a request (e.g., request a status of an account, replacement of a product, disconnection of service), input information (e.g., change of address, change of purchase order information, change a status of a previous request), or reporting an emergency condition (e.g., electrical wires down, smell of gas, weather condition). For any particular application, a person of skill in the art may use available information regarding a company (such as its products, services, and customers) to determine an appropriate list of intents. In some implementations, described in greater detail below, the list of intents may be modified, such as by changing an intent or adding a new intent. In some implementations, a message may have more than one intent (e.g., a longer message with a compound sentence or multiple sentences) or multiple messages may be processed to determine an intent (e.g., where a customer partially enters a message and completes it in a subsequent message).

In FIG. 1A, the implemented action is shown with box 120 to inform the user the address change application is being started, and box 130 that is the next step in the address change application. The customer may then continue with the action to complete the address update (not shown in FIG. 1A).

Figure 2A:
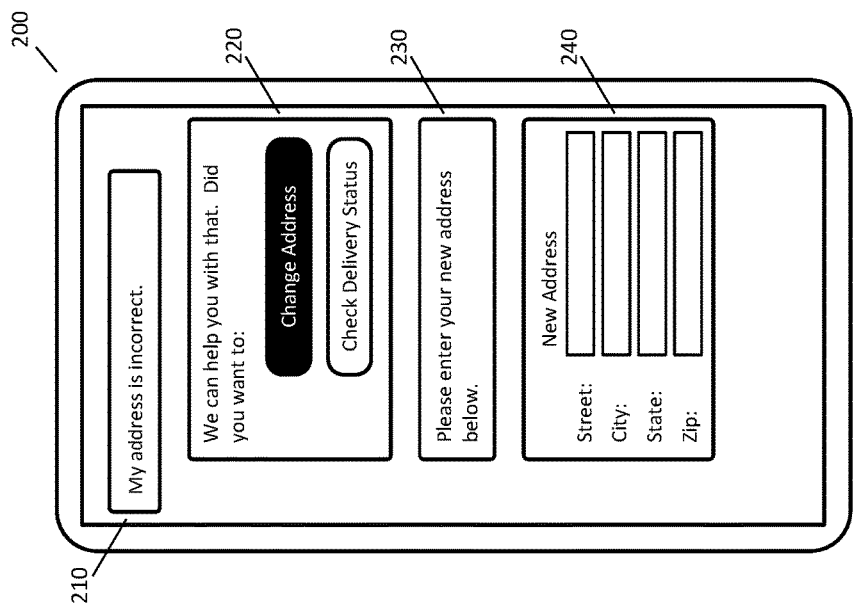
FIG. 2A is an example user interface for a natural language interface.

FIG. 2A illustrates another example automated customer support session on a customer device and FIG. 2B is a flowchart of this example implementation of providing automated customer support. In FIG. 2A, the customer has used customer device 200 to access a user interface for obtaining support from a company, and the customer has entered message 210 "My address is incorrect."

At step 250 of FIG. 2B, a company receives the message of the customer. At step 260, the company processes the message to determine one or more possible intents of the message. Multiple intents may be selected, for example, because there is some uncertainty as to the correct intent (e.g., if the scores of the two highest-scoring intents are close to each other). At step 260, the company may present information about the possible intents to the customer as shown in box 220 of FIG. 2A.

Clarification information may then be received from the customer to determine a final intent. For example, the intents may be presented to the customer, and the customer may then select the intent that best matches his request. As used herein, clarification information refers to any information received from a customer to determine a final intent from one or more possible intents.

In box 220, the customer has selected the "Change Address" intent. At step 265, the company receives the clarification information (e.g., the selection of the intent) from the customer and determines that the final intent is the change address intent. At step 270 the company obtains an action corresponding to the selected intent, such as the address change application described above. At step 275, the company implements the address change application, such as by presenting box 230 and box 240 to the customer.

The interactions between the customer and the company may be referred to as a natural language interface because the customer is able to request assistance from the company by entering a natural language message. As used herein, a natural language interface is any communications interface where a person communicating using the interface is able to transmit natural language using the interface. For example, a natural language interface may include a person entering a typed message or speaking to a microphone.

Figure 3:
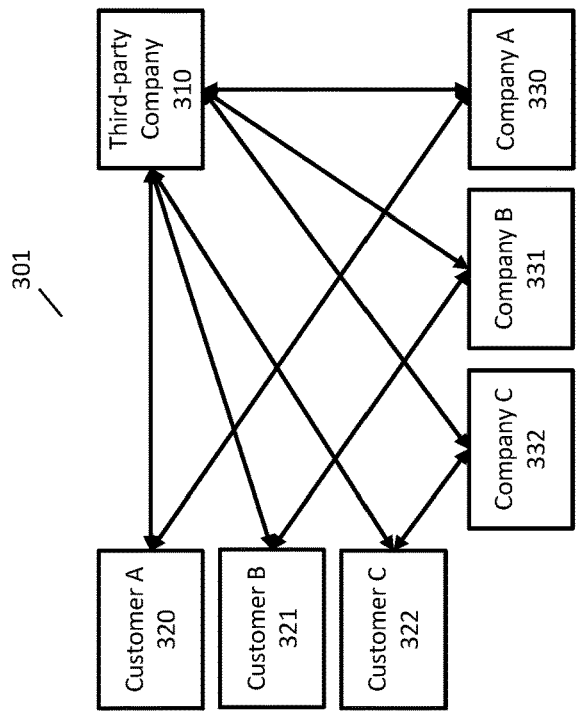
FIG. 3 is an example system for a third-party company to provide services to multiple companies.

A company providing customer support to its customers may desire to use the services of a third-party company to improve the customer support experience and to reduce overall customer support costs. For example, a company may find it more cost effective to use semantic processing services of a third-party company than to implement its own semantic processing services. FIG. 3 illustrates an example architecture that may be used by a company to obtain assistance from a third-party company in providing customer support to its customers.

FIG. 3 illustrates a system 301 that allows a third-party company 310 to provide customer support services to multiple companies. In FIG. 3, third-party company 310 is providing customer support services to company A 330, company B 331, and company C 332. Third-party company 310 may provide customer support services to any number of companies.

Customers of each company may seek customer support from a company where the support process uses the services of third-party company 310. For example, customer A 320 may be seeking support from company A 330, customer B 321 may be seeking support from company B 331, and customer C 322 may be seeking support from company C 332. It may or may not be apparent to the customers whether they are seeking customer support directly from the company or using services of third-party company 310.

Third-party company 310 may assist a company in providing customer support in a variety of ways. In some implementations, third-party company 310 may assist in connecting a customer with a customer service representative working on behalf of the company. For example, third-party company 310 may select a customer service representative, may provide a user interface to a customer to make it easier for a customer to request support, and may provide a user interface to a customer service representative to assist the customer service representative in responding to a request of a customer. A customer service representative may have any appropriate relationship with the company on behalf of which it is providing customer support. For example, a customer service representative may be an employee or contractor of a company and providing customer support to only customers of that company, or a customer service representative may be providing services to multiple companies and providing support to customers of the multiple companies at the same time.

The communications between third-party company 310, customers, and companies may be architected in a variety of ways. In some implementations, all communications between a customer and a company may be via third-party company 310 and there may not be any direct connection between the customer and the company. In some implementations, third-party company 310 may communicate with the company but may not communicate directly with the customer. In some implementations, a customer may communicate directly with the company and also third-party company 310.

Where a customer is connected to both a company and third-party company 310, each of the two connections may be used for different kinds of requests. For example, where the customer is interacting with the company in a way that does not require the services of third-party company 310 (e.g., navigating a web site of the company), the customer may use the network connection with the company. Where the customer is interacting with the company in a way that uses the services of third-party company 310, the customer may use the network connection with third-party company. It may not be apparent to the customer whether the customer is using a network connection with the company or with third-party company 310.

Figure 4:
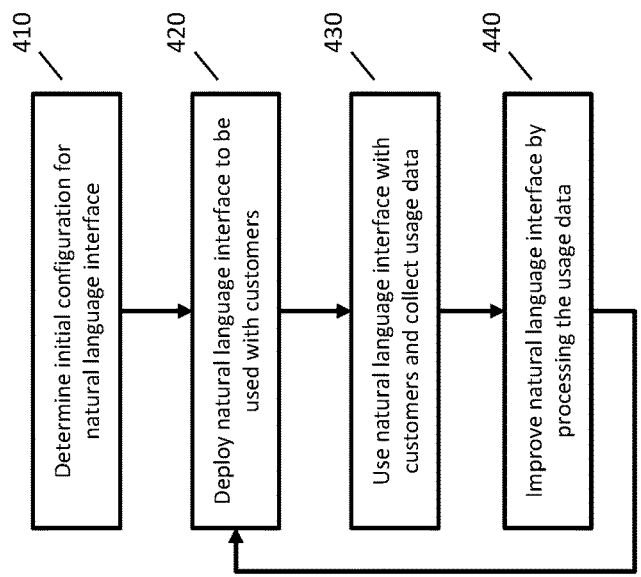
FIG. 4 is a flowchart of an example implementation of configuring and improving a natural language interface.

FIG. 4 is a flowchart of an example implementation of creating a natural language interface and improving the natural language interface over time by processing usage data of the natural language interface. FIG. 4 may be implemented by a company on its own or by a third-party company that provides services to companies for at least some aspects of implementing a natural language interface.

At step 410 an initial configuration for a natural language interface is determined. For example, the configuration of the natural language may include specifying a list of intents that are to be understood by the natural language interface. The configuration may also include an initial set of seed messages for each intent, such as example messages illustrating how customers may express the intent.

At step 420, the natural language interface is deployed so that it may be used by customers. Deployment may include training models, such as training an intent classifier that may classify a message as corresponding to one or more intents, and then implementing them on a server that may be accessed by customers.

At step 430, the natural language interface is used by customers, and usage data is collected. The usage data may include interactions of customers with the natural language interface and each interaction may include a message received from a customer, one or more intents corresponding to the message as determined by an intent classifier, and an indication as to whether the interaction was successful (e.g., whether the message was classified correctly or the customer was able to obtain the desired assistance).

At step 440, the natural language interface is improved by processing the usage data. For example, it may be determined that a first intent is being confused with a second intent and that the configuration should be updated to more clearly distinguish those intents. For another example, it may be determined that an existing intent should be split into two intents.

Each of these steps are described in greater detail below.
Configuration of Natural Language Interface A company may need to configure a natural language interface. For example, the first time a natural language interface is implemented, the company may need to specify the intents to be handled by the natural language interface (e.g., address change, cancel service, etc.). A company may configure a natural language interface on its own or use the services of a third-party company to do so. In the following, the use of a third-party company is presented for clarity of presentation, but the same techniques may be implemented by a company for itself.

Figure 5:
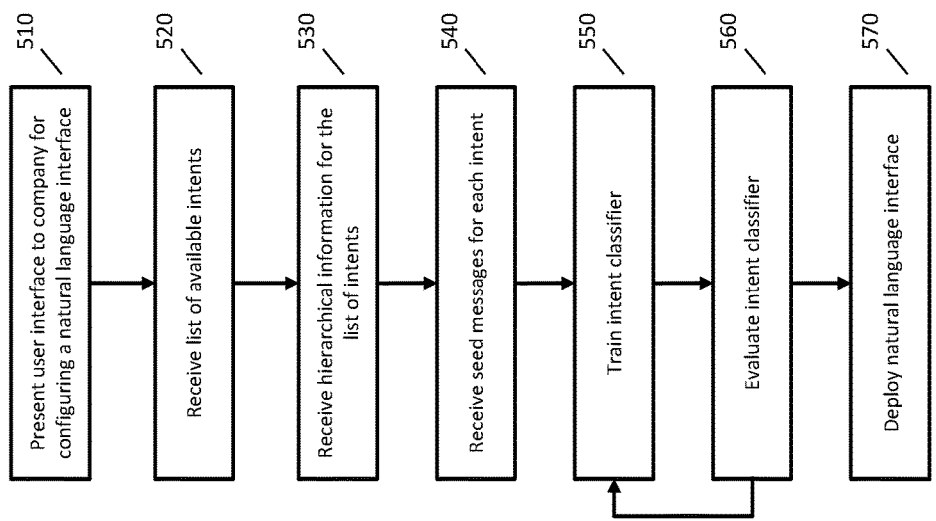
FIG. 5 is a flowchart of an example implementation of configuring a natural language interface.

FIG. 5 is a flowchart of an example implementation of configuring a natural language interface. At step 510, a user interface is presented by third-party company to a company for providing configuration information relating to the natural language interface. The third-party company may use any appropriate techniques in providing a user interface to companies, such as creating a web page that allows the companies to provide information to configure the natural language interface.

At step 520, third-party company receives information about a list of intents from the company. The information about the list of intents may be specified using any appropriate techniques. For example, for each intent provided by the company, the company may specify a name for the intent (e.g., a change address intent), a longer description of the intent (e.g., "This intent allows a customer to change his address."), and an action to perform when the intent is selected (e.g., an address of a web application to be launched with the customer). An intent may be associated with any appropriate action, such as launching a program with the customer (e.g., web application or smart phone application), providing a message to the customer ("Your package is arriving on Thursday."), providing a resource to the customer (e.g., directing the user to a web page that provides the customer with information), or connecting the customer with a customer service representative (e.g., via a messaging interface or a phone call).

Figure 6:
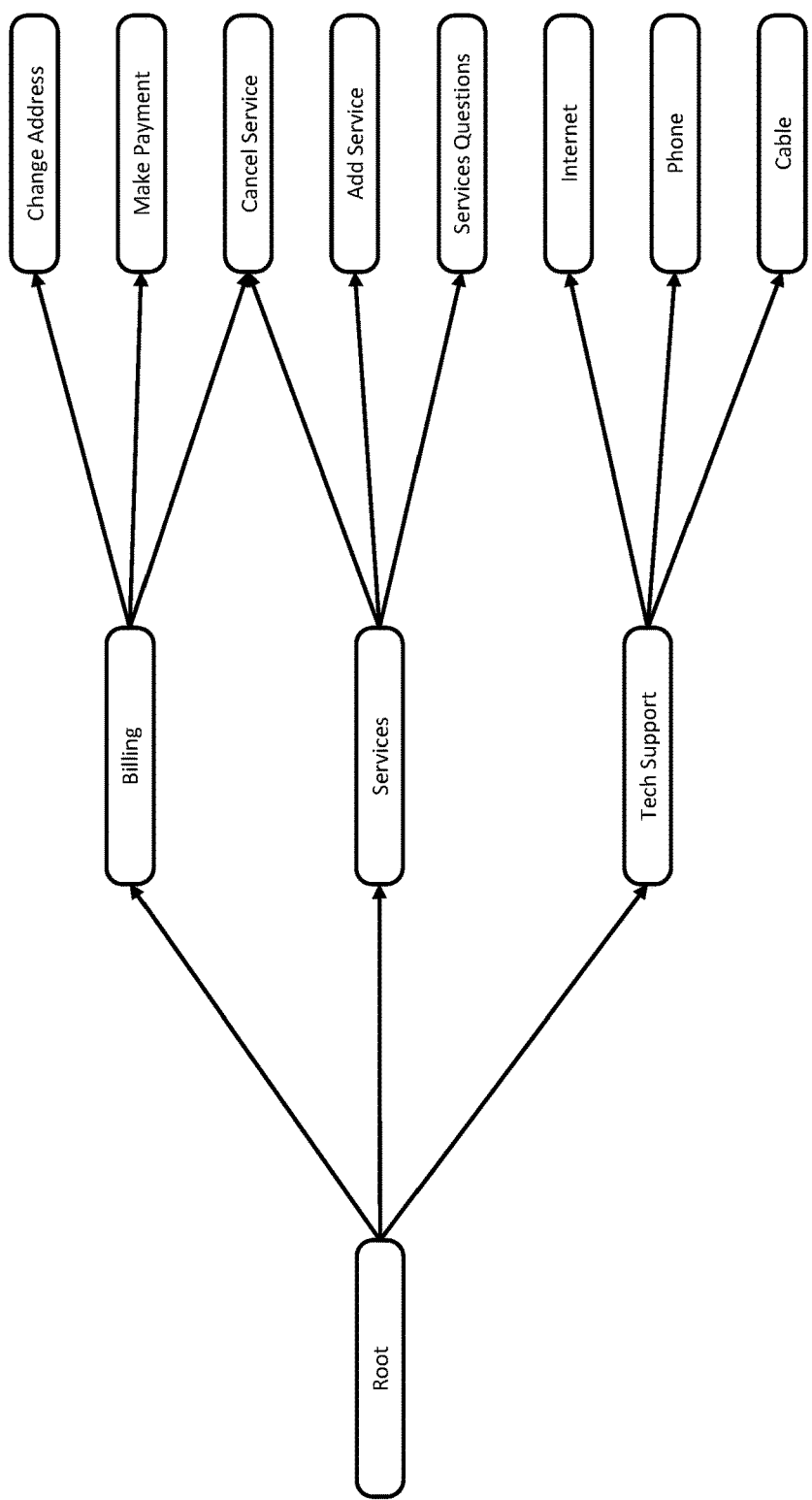
FIG. 6 is an example list of intents and hierarchical information relating to the list of intents.

At step 530, third-party company receives hierarchical information about the list of intents, such as a graph or a tree indicating relationships between intents. FIG. 6 illustrates example hierarchical information for a list of intents in the form of a graph. In FIG. 6, the intents are shown along the right side of the figure (e.g., "Change Address"). The top or root node of the graph is on the left side of the figure. The graph may group or categorize the intents based on a similarity of the subject matter of the intents. FIG. 6 illustrates nodes for three categories: Billing, Services, and Tech Support. Each of these categories has multiple intents associated with it. For example, the Billing category includes nodes for the intents Change Address, Make Payment, and Cancel Service. An intent may belong to more than one category. For example, the Cancel Service intent is included in the Billing Category and the Services category. The hierarchical information may include additional levels, such as categories, sub-categories, and then intents.

The hierarchical information may facilitate a customer or a customer service representative in navigating to the intent needed by the customer. In some situations, the customer may provide a message that does not clearly specify the needs of the customer. For example, the customer may transmit the message "Need Internet," and it may be unclear from the message if the customer would like to add a service relating to the Internet or may need tech support relating to the Internet. As described in greater detail below, the hierarchical information may be used to disambiguate the customer's request.

In some implementations, a company may not provide hierarchical information about the list of intents, and the intents may be used without any hierarchical relationship.

In some implementations, the list of intents may include an "Other" intent to capture messages from a customer that do not match any of the other intents provided by the customer. For example, the Other intent may operate as a universal background model.

At step 540, third-party company receives example messages or seed messages for each of the provided intents from the company. The example messages may be created by a person or may be extracted from existing logs of customer support sessions. The messages may be provided using any appropriate techniques, such as by providing a text file for each intent where each line of the text file is an example message for the intent. Where the list of intents includes an Other intent, the Other intent may be seeded with messages that do not match any of the intents provided by the customer.

At step 550, third-party trains an intent classifier using the seed messages. Any appropriate classifier may be used for the intent classifier, such as a neural network, a recurrent neural network, a support vector machine, or a logistic regression classifier. The intent classifier may process a message (e.g., the text of the message or word embeddings corresponding to the message) and output a score for each of the available intents, where a score indicates a match between the message and the intent.

At step 560, the performance of the intent classifier may be evaluated. Any appropriate evaluation procedures may be used. For example, each of the seed messages may be processed by the intent classifier to make sure that they are classified as belonging to the intent for which the message was seeded. During evaluation, a person doing the evaluation may be able to enter a message for evaluation by the classifier to see the highest scoring intent for the entered message or the scores for each intent. The intent classifier may also be tested against a test set of messages where each message of the test set has been labelled with an intent, and an error rate for the test set may be computed and presented to a user. During the evaluation process, the configuration for the natural language interface may be changed. For example, the hierarchy may be altered, intents may be added, intents may be removed or merged, and seed messages may be added, removed, or moved to a different intent.

At step 570, the natural language interface is deployed. For example, the software implementing the natural language interface may be deployed to one or more servers using the trained intent classifier.

Deployment of Natural Language Interface

After the natural language interface is deployed, it may be used by customers to obtain assistance from the company. Third-party company may deploy natural language interfaces for multiple companies simultaneously. For example, customers of a first company may use a first natural language interface, customers of a second company may use a second natural language interface, and so forth.

Figure 7:
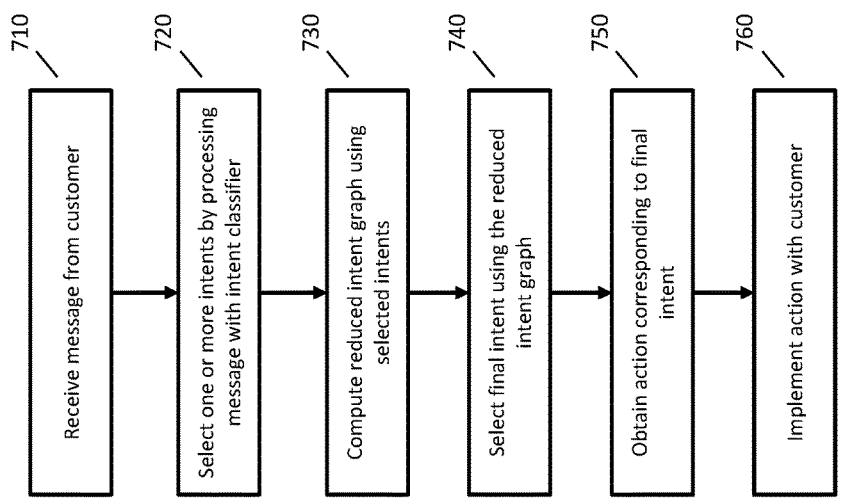
FIG. 7 is a flowchart of an example implementation of a natural language interface with a customer.

FIG. 7 is a flowchart of an example implementation of a natural language interface by a company on behalf of a company by third-party company. At step 710, a message is received from a customer, such as by using any of the techniques described above.

At step 720, one or more intents are selected by processing the message with an intent classifier. Any appropriate techniques may be used for selecting the one or more intents using the output of the classifier. For example, all intents with a score above a threshold may be selected, or the top N scoring intents may be selected. In some instances, a single intent may be selected, and, in such instances, steps 730 and 740 may be skipped and processing may proceed to step 750.

Any appropriate intent classifier may be used. For example, the intent classifier may have been trained using unsupervised, semi-supervised, or supervised techniques. An intent classifier may process feature vectors computed from the words (or possibly n-grams of words) of the message. For example, for each word of the message, a 1-hot vector or a word embedding may be obtained to represent the word. In another example, the message may be represented as a bag of words.

For example, where the intent classifier is a recurrent neural network, the recurrent neural network may sequentially process the feature vectors of the words of the message, and compute one or both of an internal state vector or an output vector at each iteration. A final vector (e.g., an internal state vector or output vector) from a final iteration may then be used to classify the intent of the message. A transformation of the final vector may be computed (e.g., a linear transform, affine transform, or a multi-layer perceptron) where the transformed final vector has a length corresponding to the number of possible intents. The largest element of the transformed final vector may be selected as corresponding to the intent of the message (or one or more largest elements may be selected as corresponding to one or more intents).

For another example, where the intent classifier is a convolutional neural network, the convolutional neural network may process a matrix created from the feature vectors of the words of the message. The convolutional neural network may perform one or more operations of filtering and max pooling to generate an output vector. A transformation of the output vector may be computed (such as the transforms described above) where the transformed output vector has a length corresponding to the number of possible intents. One or more intents may be selected using the transformed output vector as described above.

For another example, the intent classifier may be a multiclass support vector machine (SVM). Any appropriate SVM may be used, such as an SVM that makes classification decisions between individual intents and all other intents, that makes classification decisions between all pairs of possible intents, or that makes classification decisions using a directed acyclic graph. After performing one or more classification decisions comparing intents, the SVM may select a one or more intents as corresponding to the message.

Figure 8A:
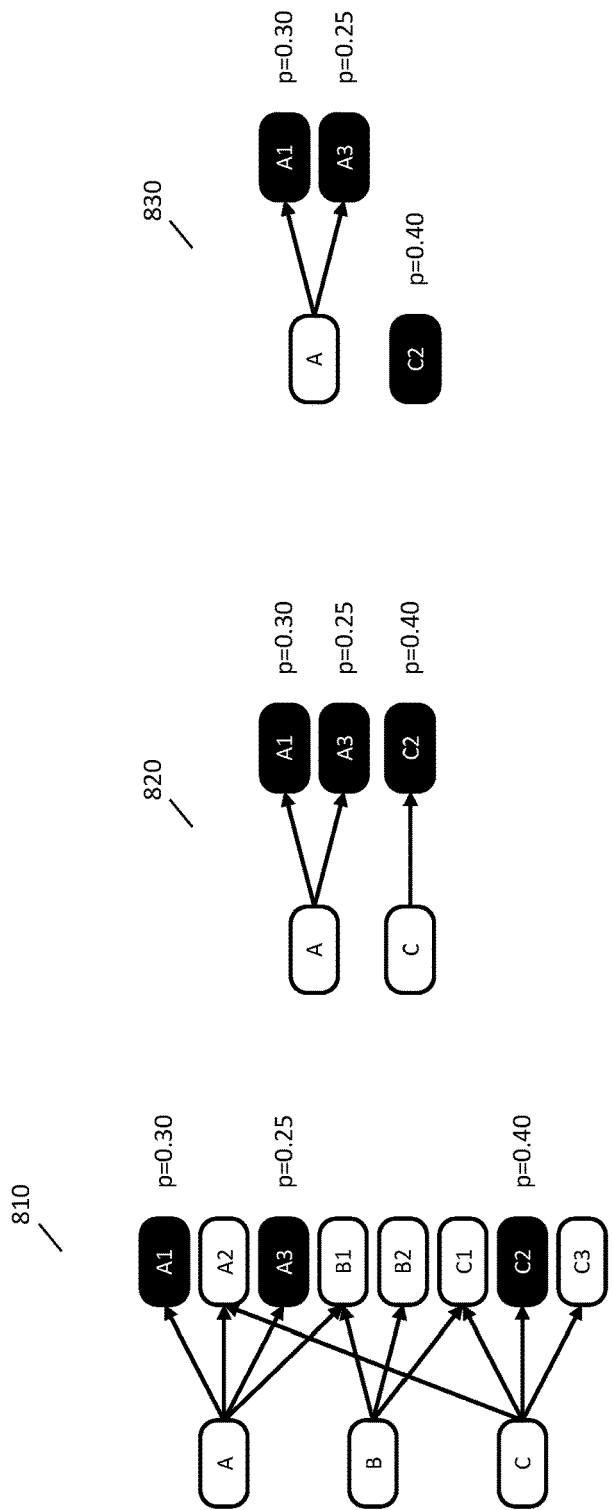
FIGS. 8A and 8B are examples of graphs and reduced graphs that may be used with a natural language interface.
Figure 8B:
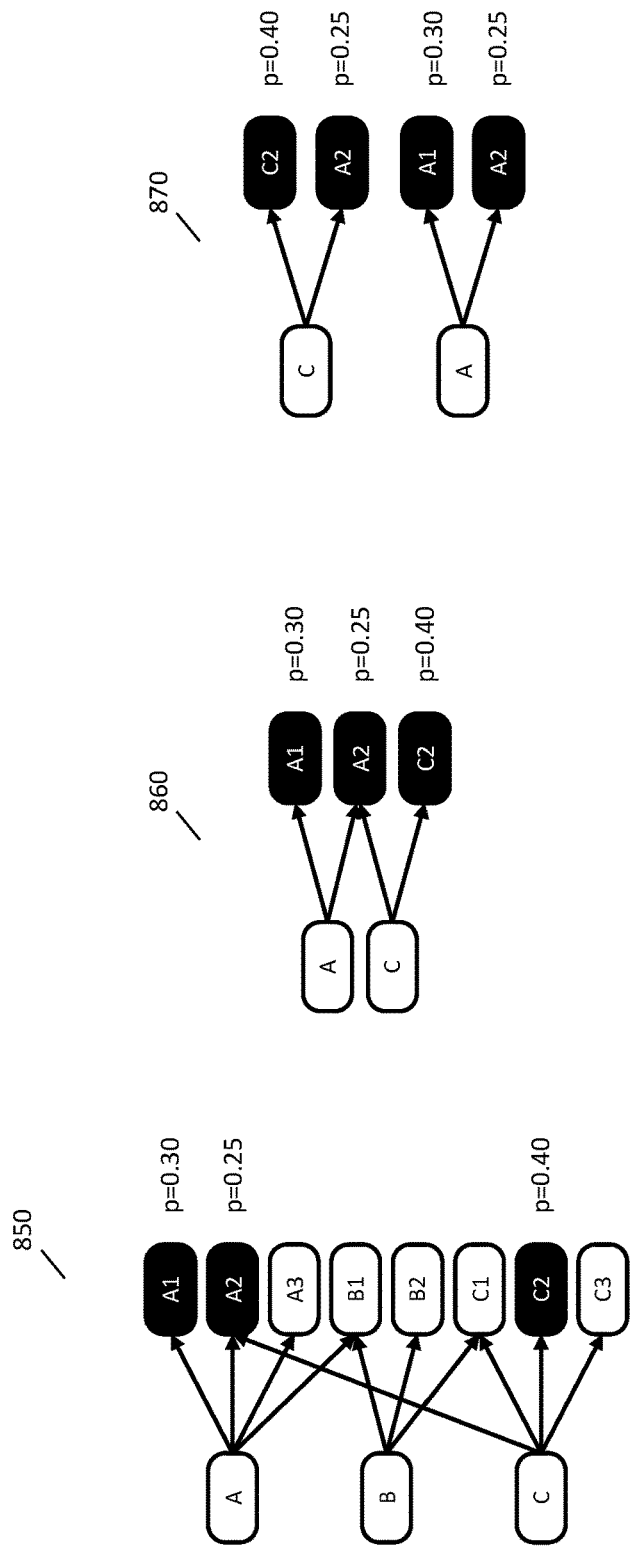

At step 730, a reduced intent graph is created using the one or more selected intents. FIGS. 8A and 8B illustrate examples of how an intent hierarchy graph (e.g., the graph of FIG. 6) may be reduced using the selected intents.

In FIG. 8A, a complete intent graph 810 is shown, where a complete intent graph corresponds to the entire hierarchy of intents provided by the company. In this example, A, B, and C represent categories of intents and A1, A2, A3, B1, B2, C1, C2, and C3 represent individual intents. In the complete intent graph 810, intents A1, A3, and C2 are highlighted because these were the intents selected at step 720. A score or probability of each of the selected intents are also shown. In FIG. 8A, a pruned intent graph 820 is shown, where intents that were not selected are pruned from the graph, and categories with no remaining intents are also pruned. If FIG. 8A, a reduced intent graph 830 is shown, where categories with only a single intent are removed and the single intent remains on its own. Reduced intent graph 830 may be used to disambiguate among the selected intents to select a final intent for the message as described in greater detail below.

FIG. 8B illustrates another example of generating a reduced intent graph. In FIG. 8B, complete intent graph 850 is the same as complete intent graph 810, except that a different set of intents was selected at step 730. In complete intent graph 850, intents A1, A2, and C2 are selected with the scores or probabilities as shown. In FIG. 8B, a pruned intent graph 860 is shown, where intents that were not selected are pruned, and categories with no remaining intents are also pruned. If FIG. 8B, a reduced intent graph 870 is shown, where the graph is converted to a tree. Reduced intent graph 870 may be used to disambiguate among the selected intents to select a final intent for the message as described in greater detail below.

At step 740, a final intent is selected using the reduced intent graph. Any appropriate techniques may be used to select the final intent using the reduced intent graph, and the techniques may depend on the type of device used by the customer (e.g., the size of the display of the device). Where the customer is using a personal computer with a large display, the complete intent graph (e.g., complete intent graph 810) may be presented to the customer along with other information such as the selected intents from step 720, probabilities of the selected intents, and any other information about each of the intents. Depending on the size of the graph and the display, the customer may be presented with a portion of the complete intent graph and may be able to navigate to other portions of the complete intent graph. The customer may then select a final intent that best matches the customer's needs.

In some implementations, the reduced intent graph (e.g., reduced intent graph 830 or reduced intent graph 870) may be presented to the customer along with any of the information about the intents or categories described above. The reduced intent graph may be sorted so that intents or categories with the highest probability are shown at the top, and intents or categories with the lowest probability are shown at the bottom. In some implementations, the customer may be able to navigate to categories or intents that are not part of the reduced intent graph. The customer may then select a final intent that best matches the customer's needs.

In some implementations, the customer may not be presented with the intent graph, but instead the customer may be presented with questions to select a final intent. For example, for the reduced intent graph 830, the customer may be asked to select between category A and intent C2. Where the customer selects category A, the customer may then be asked to select between intent A1 and intent A3. Alternatively, the customer may be asked to select among intents A1, A3, and C2. For reduced intent graph 870, the customer may similarly be asked to select category C or category A, and then asked to select an intent from the selected category. Alternatively, the customer may be asked to select among intents C2, A1, and A2. The number of options in a question may depend on the size of the display of the customer's device.

In some implementations, a customer service representative may assist in the selection of a final intent. For a customer service representative, it may be preferred to show the complete intent graph since a customer service representative may be more likely to have a larger display and may be more accustomed to viewing and navigating an intent graph. The customer service representative may also be able to view the message entered by the customer. The customer service representative may select the final intent for the customer after viewing the message from the customer.

In some implementations or instances, a customer service representative may select the final intent on behalf of the customer without the customer being aware of the involvement of the customer service representative. The customer service representative may select an intent to cause an action to be implemented with the customer (e.g., an address change action), and the action may be immediately implemented without the customer and customer service representative exchanging messages. In some implementations or instances, the customer and customer service representative may exchange messages while the customer service representative is selecting a final intent on behalf of the customer.

In some implementations, hierarchical information may not be available or may not be used with a list of intents, and accordingly a reduced intent graph may not be created. A final intent may be selected from the one or more intents selected at step 720 and steps 730 and 740 may be omitted.

At step 750 an action is obtained corresponding to the final intent, and at step 760, the action is implemented with the customer. These steps may use any of the techniques described above.

The natural language interface may be similarly used with a large number of customers of the company. Usage data of the natural language interface may be collected and used to improve the natural language interface as described below.

Improvement of Natural Language Interface

Usage data of the natural language interface may be collected and used to improve the natural language interface. Each session with a customer may be referred to as an interaction, and data may be collected for each interaction. Any appropriate data may be collected for an interaction, such as the message sent by the customer, the scores computed by the intent classifier, one or more intents selected by the intent classifier, a final intent such as a final intent selected as described above, and an indication of success or failure for the interaction. The usage data may include data collected from some or all of the interactions during a time period. The usage data may then be analyzed to determine the performance of the natural language interface and to determine changes to the natural language interface to improve performance.

Any appropriate techniques may be used to determine an indication of success for failure for an interaction. In some implementations, the indication may be a boolean value indicating success or not. In some implementations, the indicate may be a value, such as a value in a range of 0 to 100 with values above a threshold (e.g., a threshold of 50) indicating success. The following are some non-limiting examples of how an indication of success may be determined for an interaction: the highest scoring intent of the classifier was the final intent used for the interaction, the customer completing the action (e.g., the customer completing the address change process), a survey of the customer after the action has been completed (e.g., asking the customer if he was happy with the outcome), comparing the output of the intent classifier with an intent selected by the customer, comparing the output of the intent classifier with the action implemented with the customer, or where the customer has interacted with a customer service representative, asking the customer service representative to indicate the success of the interaction.

Figure 11:
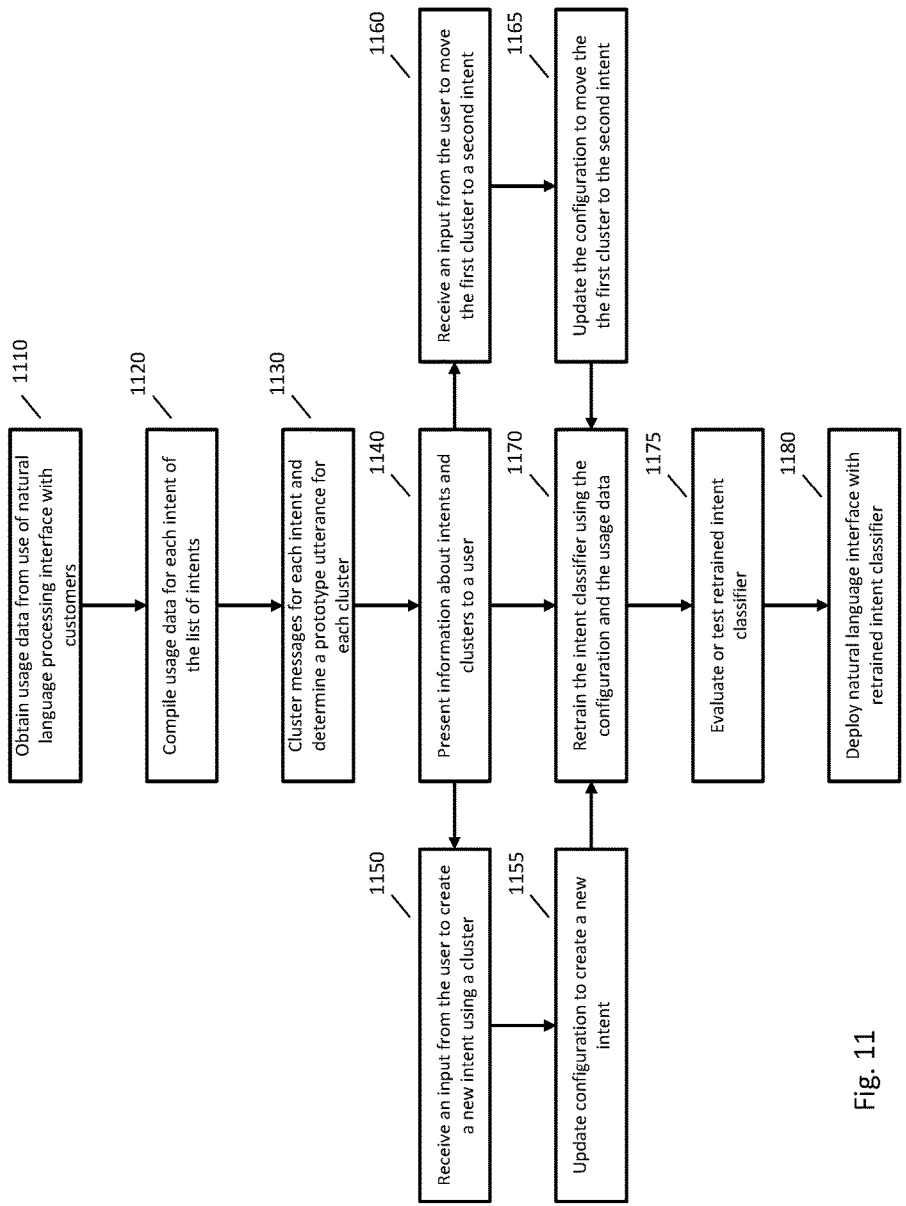
FIG. 11 is a flowchart of an example implementation of improving a natural language interface by processing usage data.

FIG. 11 is a flowchart of an example implementation of processing usage data to improve a natural language interface. At step 1110, usage data of the natural language interface is obtained, such as any of the usage data described above.

At step 1120, usage data is compiled for each intent of the list of intents. Each interaction may be assigned to an intent using any appropriate criteria. For example, an interaction may be assigned to an intent corresponding to the highest score of the intent classifier or to a final intent selected as described above. FIG. 9A illustrates example usage data that has been compiled for the change address intent. In FIG. 9A, a table shows messages that were received from a customer corresponding to the change address intent, the number of times that message was received, and a success rate for that message (using any of the indications of success described above.).

At step 1130, the messages assigned to an intent are clustered. For any intent, there may be a large number of ways that a person could express that intent. Some of the ways for expressing an intent may be similar to other ways and some ways may be quite different from other ways. For example, in FIG. 9A for the change address intent, the first three messages are similar to one another: "I want to change my address"; "I need to change my address"; and "I would like to change my address." Other ways of expressing the intent may be quite different, such as the message "I moved." When collecting messages corresponding to an intent, there may be a large number of ways of expressing that intent and thus the table in FIG. 9A could have hundreds, thousands, or even more unique messages.

To facilitate analysis of the intent, the messages corresponding to the intent may be clustered so that messages that are similar to one another are likely in the same cluster and messages that are very different from each are likely in different clusters. Any appropriate techniques may be used to cluster messages.

In some implementations, a message embedding may be computed for each message, where a message embedding is a vector in an N-dimensional vector space that represents the message but does so in a manner that preserves useful information about the content of the message. Any appropriate techniques may be used to compute message embeddings from a training corpus (e.g., stored messages between customers and CSRs).

In some implementations, message embeddings may be computed using latent semantic indexing. A feature vector (e.g., word counts or term frequency-inverse document frequency values) may be computed for each message of a training corpus of messages, a matrix may be created by combining the feature vectors, and the message embeddings may be obtained by performing a singular value decomposition of the matrix. See Deerwester, "Improving Information Retrieval with Latent Semantic Indexing," Proceedings of the 51st ASIS Annual Meeting (ASIS '88), Vol. 25 (October 1988).

In some implementations, message embeddings may be computed using latent Dirichlet allocation and computing a message embedding as a mixture of topics from a topic model. See Blei et al., "Latent Dirichlet Allocation," Journal of Machine Learning Research, vol. 3, pp. 993-1022, (2003).

In some implementations, message embeddings may be computed as paragraph vectors where the paragraph vectors are trained to predict the next word of the paragraph given a context of the paragraph. See Le et al., "Distributed Representations of Sentences and Documents," Proceedings of the 31st International Conference on Machine Learning, W&CP vol. 32, Beijing, China, 2014.

In some implementations, message embeddings may be computed as the final hidden state of a recurrent neural network using an encoder-decoder language model. See Kiros et al., "Skip-Thought Vectors," Proceedings of the 28th International Conference on Neural Information Processing Systems, vol. 2., pp. 3294-3302, 2015.

Figure 10:
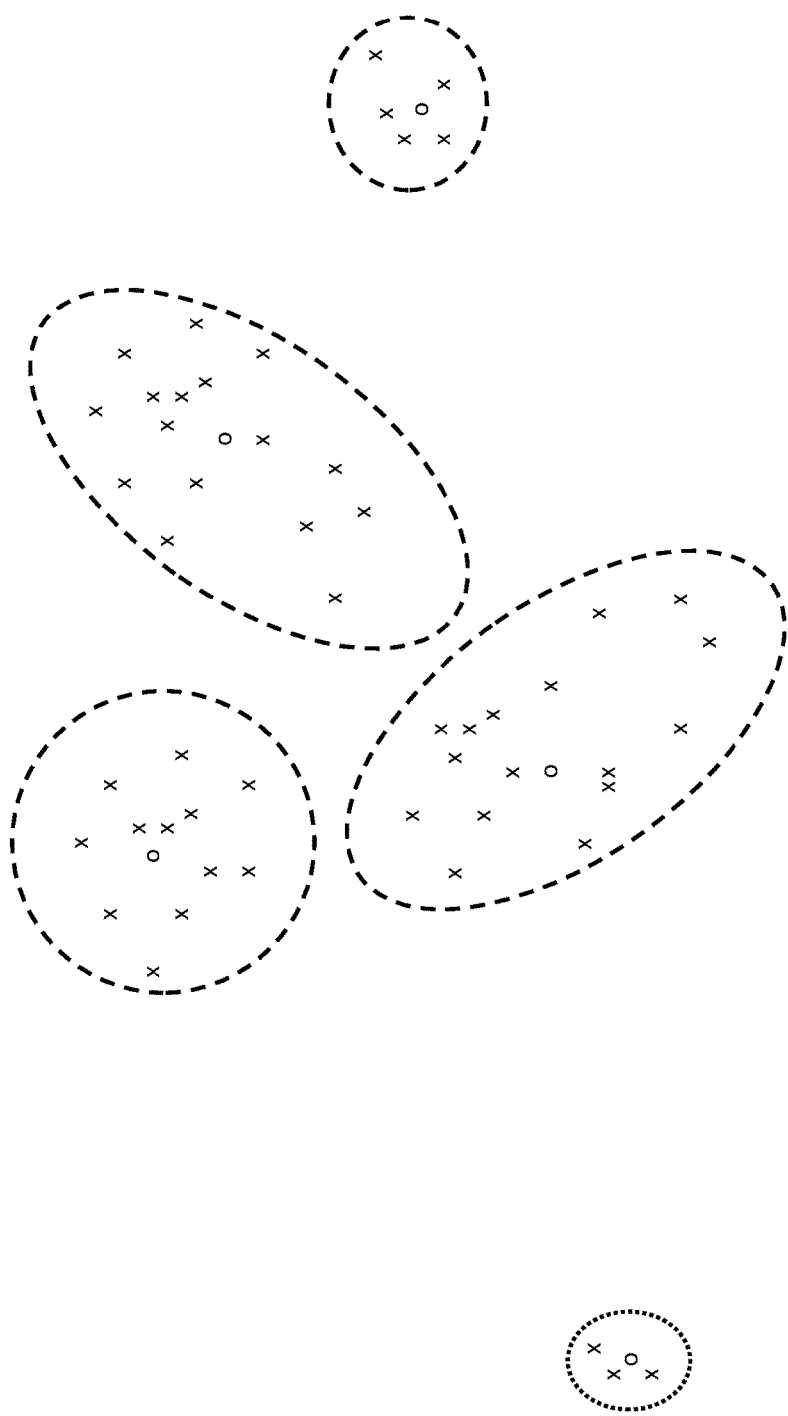
FIG. 10 is an example clustering of usage data for an intent.

FIG. 10 illustrates a conceptual representation of message embeddings in a vector space. In the example of FIG. 10 the vector space is two dimensions, but in a real application, the number of dimensions would be much higher. Each message is represented by an "x" or an "o" (the difference will be explained below). After a message embedding has been computed for each message, the message embeddings may be clustered using any appropriate clustering algorithm, such as k-means or agglomerative clustering. In FIG. 10, possible clusters of messages are indicated by the dashed ovals. Each cluster is likely to contain similar manners of expressing the intent. For example, the messages "I want to change my address"; "I need to change my address"; and "I would like to change my address" are likely to be in the same cluster.

To describe the cluster, a message may be generated or selected from the cluster and referred to as a prototype message. Any appropriate techniques may be used to obtain a prototype message for a cluster. In some implementations, the prototype message may be a most frequent message, a message with a largest count, a message closest to the center of the cluster (e.g., geometrically or by center of mass), a message having a selected language type (e.g., simplest language, most commonly used words, or the inclusion or exclusion of jargon or selected words), or a randomly selected message. In some implementations, the prototype message may be generated instead of being selected and the prototype message may be different from the messages in the cluster. For example, a prototype message may be generated by processing the messages of the cluster with an encoder neural network and then generating the prototype message with a decoder neural network. For another example, a prototype message may be generated by creating parse trees for the messages in the cluster, transforming the parse trees into a single parse tree, and then generating the prototype message using the transformed parse tree. In the example of FIG. 10, the prototype message is represented as an "o" instead of an "x."

FIG. 9B is an example list of clusters for the change address intent that may be determined from the usage data of FIG. 9A. In FIG. 9B, the first cluster has "I need to change my address" as a prototype message and this cluster also includes the messages "I want to change my address" and "I would like to change my address." Each cluster may include additional information about the cluster, such as the total count of messages in the cluster and a success rate of the messages in the cluster.

At step 1140, information about the intents and clusters is presented to a user to allow the user to improve the natural language interface. In some implementations, third-party company may present a user interface to one of its own employees, an employee of the company for whom it is providing the natural language interface, or another person. Any appropriate information may be presented about the natural language interface, such as any of the following: the list of intents, hierarchical information corresponding to the intents, statistics relating to the intents, and information about clusters (e.g., a prototype message and statistics for the clusters).

For example, third-party company may present a user interface that shows a success rate for each of the intents. A first intent may have a low success rate and a person may select the first intent to see additional details relating to that intent. In response, the user interface may present information about the clusters in the first intent, such as the prototype messages and statistics.

The usage data for a natural language interface may include a very large number of interactions, and accordingly there may be a very large number of unique messages. Because of the large number of messages, it may be difficult for a user to view individual messages and understand the performance of the natural language interface. By combining similar messages into a cluster and providing a prototype message for the messages in the cluster, it may be much easier for a person to understand which aspects of the natural language interface are working well and which aspects need improvement. For example, a single intent may have tens of thousands of unique messages, but these messages may be clustered into five clusters that are presented to a user. The user can then view information about each of the five clusters to better understand why some clusters are working well and some clusters are not.

The user interface may include controls to allow the user to modify the natural language interface. Any appropriate controls for any appropriate modifications may be included. For example, the user interface may include a control to create a new intent, a control to move a cluster from a first intent to a second intent, or a control to retrain the natural language interface using the usage data. From step 1140, processing may proceed to step 1150, step 1160, or 1160 according to the actions of the user.

In some implementations, the user may be able to make other changes at step 1140. For example, the user may be able to change the hierarchical information relating to the list of intents to improve the ability of a customer or other person to navigate the intent hierarchy.

In some implementations, suggestions may be presented to the user at step 1140. Any appropriate suggestions may be presented, such as a changes to the intents or the hierarchical information of the intents. In some implementations, where a cluster of an intent has a success rate below a threshold, that cluster may be highlighted or a suggestion may be presented to the user to create a new intent with the cluster or move the cluster (or a portion thereof) to a new or different intent. For example, a cluster with the low success rate may be compared with clusters of other intents using any appropriate distance metric (e.g., a Mahalanobis distance). Where the cluster with the low success rate is close to a cluster of a second intent, the suggestion may be to move the cluster to the second intent. Where the cluster with the low success rate is not close to any existing cluster, the suggestion may be to create a new intent with the cluster.

In some implementations, suggestions may be presented to improve the hierarchical information. The usage data may include, for each interaction, navigation information relating to a user (e.g., the customer or customer service representative) navigating the intent graph. Where a user commonly navigates from a first node of the graph to a second node, and there is not a direct connection between the first node and the second node, a suggestion may be made to modify the hierarchical information to include a connection between the first node and the second node.

At step 1150, third-party company has received an input from the user to create a new intent using a cluster. In reviewing the information about the clusters of an intent, the user may determine that customers are frequently requesting an operation that is not covered by any of the existing intents. For example, from the example clusters of FIG. 9B, a user may determine that the cluster with prototype "I'm on vacation" is sufficiently different from the prototypes for the other clusters that a new intent should be created for providing services to customers when they go on vacation (e.g., temporarily halting services or placing a hold on sending packages to the customer). The user may specify any appropriate information for the new cluster, such as a name, a description, or seed messages. The user may also specify that some or all of the messages from an existing cluster (e.g., cluster 5 of FIG. 9B) may be assigned to the new intent.

At step 1155, third-party company may update the configuration for the natural language interface, such as by updating a configuration stored in a data store of third-party company.

At step 1170, third-party may retrain the intent classifier using the configuration and the usage data. Previously, the intent classifier was trained using seed messages, which may be relatively small in number when a natural language interface is first created because of a lack of available data. Once the natural language interface has been used by customers, the intent classifier may be trained using some or all of the messages provided by customers. In training the intent classifier the messages used to train each intent may be the messages as compiled at step 1120, except that a new intent was created at step 1155 using the cluster of messages specified by the user.

Returning back to step 1140, the user may instead decide that the natural language interface would likely perform better if a cluster of messages currently at a first intent are moved to a second intent. For example, there may be an existing intent for temporary suspension of services, and the user may decide that the cluster relating to the customer going on vacation should be moved to the intent for temporary suspension of services.

At step 1160, third-party company receives an input from the user to move a cluster of messages from a first intent to a second intent. At step 1165, third-party company modifies the configuration of the natural language interface so that this cluster of messages is now assigned to the second intent.

At step 1170, the intent classifier is retrained using the updated configuration and the usage data as described above.

Returning back to step 1140, the user may decide to not make any changes to the configuration and instead to simply retrain the intent classifier using the usage data. Accordingly, processing may proceed to step 1170 where the intent classifier is retrained without any changes to the configuration.

At step 1175, the retrained intent classifier may be evaluated or tested to make sure that the retrained intent classifier is performing well. Any appropriate evaluations or tests may be performed. In some implementations, the retrained classifier may be backtested with the usage data or with other data. For example, the retrained classifier may be used to obtain classification results for each message from the usage data that had been marked with a positive indication of success. It may be desired that the retrained intent classifier produce that same intent that was produced by the previous classifier. Where the retrained intent classifier produces a different intent for more than a threshold number of messages from the usage data, processing may proceed back to step 1140 to allow further actions to be taken. Where the retrained classifier passes the evaluations or tests, then processing may proceed to step 1180.

At step 1180, the natural language interface is deployed with the updated intent classifier that was trained at step 1170. Customers may now access the natural language interface with hopefully improved performance.

In some implementations, the user interface may allow user to access information about individual messages in a cluster in addition to the prototype. For example, the user interface may allow the user to view any of the messages for the intent as shown in FIG. 9A. In some implementations, the user interface may allow the user to provide an input regarding one or more messages, such as to create a new intent with the one or more messages or to move the one or more messages from a first intent to a second intent.

The processing of FIG. 11 may be repeated any number of times to improve the natural language interface. For example, the processing of FIG. 11 may be performed at regular intervals, such as once a week or once a month. In some implementations, the processing may be performed more frequently when the natural language interface is first launched and less frequently after the natural language interface has reached a desired performance level.

Implementation

Figure 12:
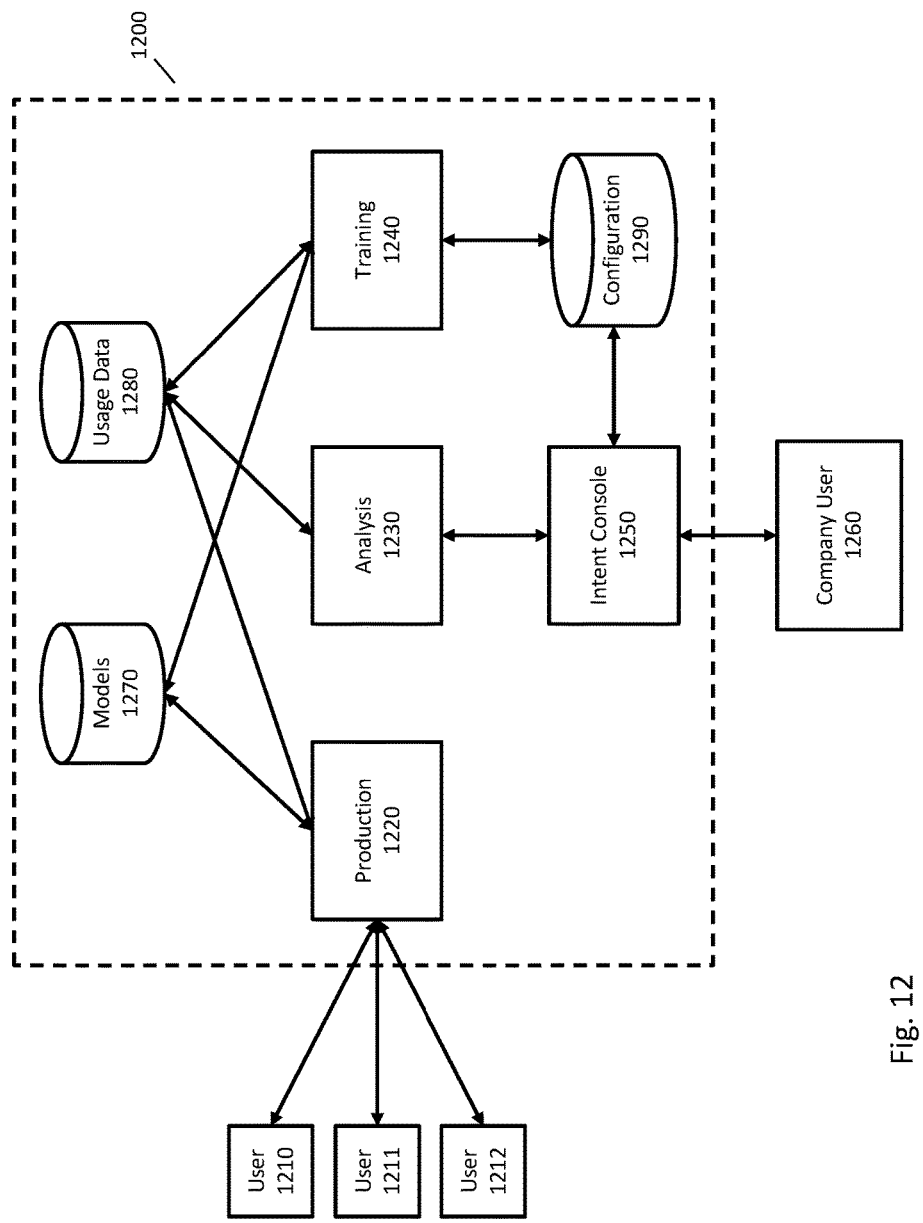
FIG. 12 is an example system that a third-party company may use to assist companies in configuring and improving a natural language interface.

As described above, a third-party company may provide services to companies to assist those companies in implementing a natural language interface for their customers. FIG. 12 is an example system that may be used by third-party company to provide these services to other companies. The system of FIG. 12 may be implemented in a variety of ways, and the system of FIG. 12 is exemplary and not a limiting example. For example, other components may be added, components may be removed or merged, and connections between components may be added or removed.

In FIG. 12, the portions of the service likely provided by third-party company are enclosed in box 1200. Third-party company may provide services to a company and company user 1260 may be employee of the company or other person assisting the company in configuring a natural language interface. User 1210, user 1211, and user 1212 may be customers of the company who are using the natural language interface to obtain support from the company. Third-party company may provide services to any number of companies, but for clarity of presentation, only one company is shown.

Third-party company may have an intent console component 1250 that presents a user interface to company user 1260 to provide an initial configuration for a natural language interface and to later update the configuration. Intent console component 1250 may receive the configuration information and store it in configuration data store 1290 so that it may be accessed by other components. Intent console may also receive analysis results (e.g., analysis of usage data) from analysis component 1230 and present the analysis results to company user 1260.

Third-party company may have a training component 1240 that may train an intent classifier for classifying messages and may also train a clustering model for clustering messages of an intent. Training component 1240 may also retrain or update classifiers and models after usage data has been collected. Training component 1240 may access any of configuration data store 1290, usage data store 1280, and models data store 1270.

Third-party company may have an analysis component 1230 that analyzes usage data of the natural language, such as any of the analysis described above. Analysis component may access usage data store 1280.

Third-party company may have a production component 1220 that allows users to interact with the natural language interface. For example, production component 1220 may receive messages from customers, determine an intent of a message, cause an action to be performed with a customer, or connect a customer with a customer service representative. Production component 1220 may access models data store 1270 and usage store 1280.

Models data store 1270 may store any appropriate models or classifiers, such as an intent classifier or a clustering model. Usage data store 1280 may store any appropriate usage data, such as the usage data described herein. Configuration data store 1290 may store any appropriate configuration information for a natural language interface, such as any of the configuration information described herein.

Figure 13:
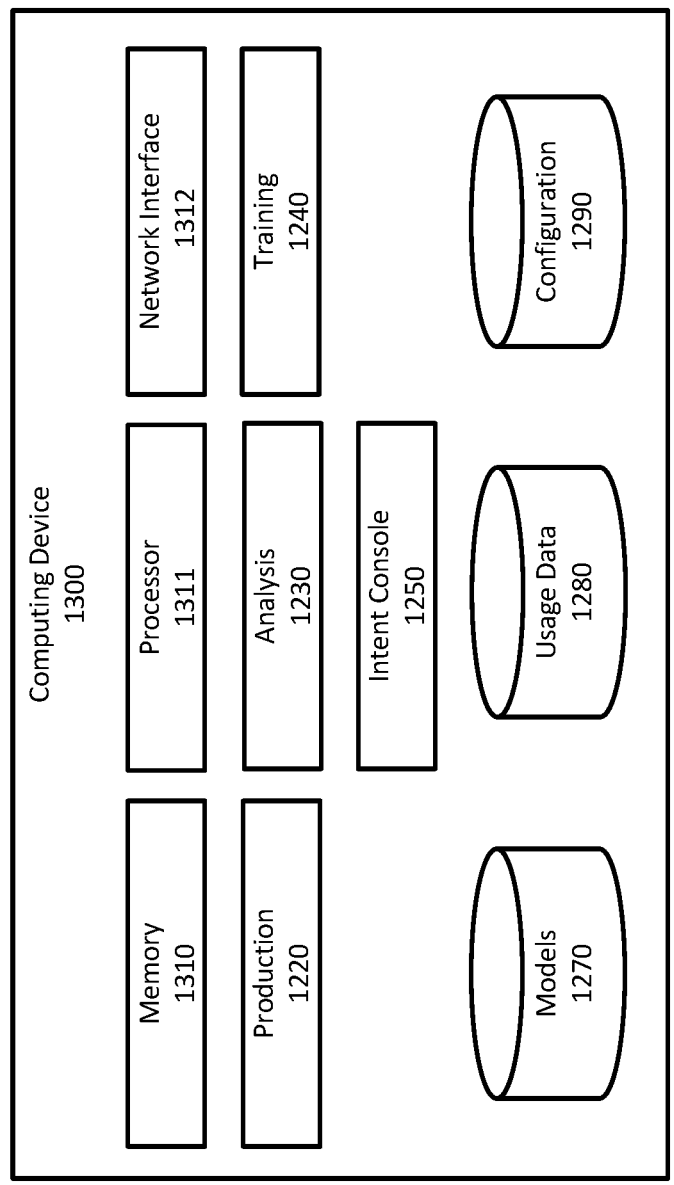
FIG. 13 is an exemplary computing device that may be used to configure and improve a natural language interface.

FIG. 13 illustrates components of one implementation of a computing device 1300 for implementing any of the techniques described above. In FIG. 13, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 1300 may include any components typical of a computing device, such as volatile or nonvolatile memory 1310, one or more processors 1311, and one or more network interfaces 1312. Computing device 1300 may also include any input and output components, such as displays, keyboards, and touch screens. Computing device 1300 may also include a variety of components or modules providing specific functionality, and these components or modules may be implemented in software, hardware, or a combination thereof. For example, computing device 1300 may include any of production component 1220, analysis component 1230, training component 1240, or intent console component 1250, as described above. Other implementations may include additional components or exclude some of the components.

Computing device 1300 may include or have access to various data stores, such as models data store 1270, usage data store 1280, and configuration data store 1290. Data stores may use any known storage technology such as files, relational or non-relational databases, or any non-transitory computer-readable media.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A system for implementing natural language interfaces to allow customers to interact with companies, the system comprising:
    at least one server computer comprising at least one processor and at least one memory, the at least one server computer configured to:
    receive a configuration for a natural language interface for a company, wherein the configuration indicates a list of intents and a plurality of seed messages for each intent of the list of intents;
    train an intent classifier using the configuration, wherein the intent classifier processes a message to classify the message as corresponding to one or more intents of the list of intents;
    deploy the natural language interface using the intent classifier, wherein the natural language interface is used by customers of the company;
    collect usage data for the natural language interface, wherein the usage data comprises a plurality of interactions, and wherein each interaction comprises a message received from one of a plurality of customers, an intent selected by the intent classifier, and an indication of success of the interaction;
    analyze the usage data by:
        obtaining a first set of interactions from the usage data, wherein the first set of interactions corresponds to a first intent of the list of intents,
        clustering messages of the first set of interactions into a plurality of clusters, and
        obtaining a prototype message for each cluster of the plurality of clusters, wherein each prototype message comprises an example message representing the associated cluster;
    provide a user interface to view information about the plurality of clusters, the information comprising the prototype message for each cluster of the plurality of clusters;
    receive an input to (i) create a new intent using a first cluster of the plurality of clusters or (ii) move the first cluster of the plurality of clusters to a second intent of the list of intents;
    update the configuration using the received input;
    update the intent classifier by retraining the intent classifier using the updated configuration and the usage data; and
    deploy the natural language interface using the updated intent classifier.

2. The system of claim 1, wherein the at least one server computer is configured to:
    provide a second user interface to the company to allow the company to configure the natural language interface; and
    receive the configuration from the company.

3. The system of claim 1, wherein the at least one server computer is configured to:
    provide a third user interface to a second company to allow the second company to configure a second natural language interface; and
    deploy the second natural language interface, wherein the second natural language interface is used by customers of the second company.

4. The system of claim 1, wherein the at least one server computer is configured to:
    receive a message from a customer seeking support from the company;
    select two or more intents by processing the message with the intent classifier;
    receive clarification information relating to the two or more intents;
    select a final intent from the two or more intents using the clarification information; and
    implementing an action with the customer corresponding to the final intent.

5. The system of claim 4, wherein the at least one server computer is configured to present hierarchical information of the two or more intents to the customer or a customer service representative.

6. The system of claim 4, wherein the clarification information is received from the customer or from a customer service representative who is assisting the customer.

7. The system of claim 1, wherein a first indication of success of a first interaction is determined by one or more of:
    asking the customer if the first interaction was a success;
    asking a customer service representative assisting the customer if the first interaction was a success;
    determining that the customer completed an action;
    comparing an output of the intent classifier with an intent selected by the customer; or
    comparing the output of the intent classifier with the action implemented with the customer.

8. The system of claim 1, wherein the at least one server computer is configured to:
    compute a success rate for a cluster;

determine to present a suggestion for improving the natural language interface using the success rate of the cluster;

present a suggestion (i) to create a new intent with the cluster or (ii) to move the cluster to another intent.

9. The system of claim 1, wherein the natural language interface processes a message received from the customer, determines an intent of the message, selects an action using the determined intent, and causes the action to be implemented with the customer.

10. A computer-implemented method for modifying a customer service message, the method comprising:

receiving a configuration for a natural language interface for a company, wherein the configuration indicates a list of intents and a plurality of seed messages for each intent of the list of intents;

training an intent classifier using the configuration, wherein the intent classifier processes a message to classify the message as corresponding to one or more intents of the list of intents;

deploying the natural language interface using the intent classifier, wherein the natural language interface is used by customers of the company;

collecting usage data for the natural language interface, wherein the usage data comprises a plurality of interactions, and wherein each interaction comprises a message received from one of a plurality of customers, an intent selected by the intent classifier, and an indication of success of the interaction;

analyzing the usage data by:
  obtaining a first set of interactions from the usage data, wherein the first set of interactions corresponds to a first intent of the list of intents,
  clustering messages of the first set of interactions into a plurality of clusters, and
  obtaining a prototype message for each cluster of the plurality of clusters, wherein each prototype message comprises an example message representing the associated cluster;

providing a user interface to view information about the plurality of clusters, the information comprising the prototype message for each cluster of the plurality of clusters;

receiving an input to (i) create a new intent using a first cluster of the plurality of clusters or (ii) move the first cluster of the plurality of clusters to a second intent of the list of intents;

updating the configuration using the received input;

updating the intent classifier by retraining the intent classifier using the updated configuration and the usage data;

deploying the natural language interface using the updated intent classifier.

11. The method of claim 10, wherein the intent classifier comprises a recurrent neural network.

12. The method of claim 10, wherein the configuration comprises a specification of an action to be performed with the customer for each intent of the list of intents.

13. The method of claim 10, wherein clustering the messages of the first set of interactions comprises:
  computing message embeddings for the messages of the first set of interactions; and
  clustering the messages of the first set of interactions using the message embeddings.

14. The method of claim 10, wherein obtaining prototype message for a cluster of the plurality of clusters comprises selecting a message with a largest count or selecting a message closest to a center of the cluster.

15. The method of claim 10, wherein obtaining the prototype message for a cluster of the plurality of clusters comprises generating the prototype message with a neural network.

16. The method of claim 10, comprising computing a success rate for each intent of the list of intents.

17. One or more non-transitory computer-readable media comprising computer executable instructions that, when executed, cause at least one processor to perform actions comprising:

receiving a configuration for a natural language interface for a company, wherein the configuration indicates a list of intents and a plurality of seed messages for each intent of the list of intents;

training an intent classifier using the configuration, wherein the intent classifier processes a message to classify the message as corresponding to one or more intents of the list of intents;

deploying the natural language interface using the intent classifier, wherein the natural language interface is used by customers of the company;

collecting usage data for the natural language interface, wherein the usage data comprises a plurality of interactions, and wherein each interaction comprises a message received from one of a plurality of customers, an intent selected by the intent classifier, and an indication of success of the interaction;

analyzing the usage data by:
  obtaining a first set of interactions from the usage data, wherein the first set of interactions corresponds to a first intent of the list of intents,
  clustering messages of the first set of interactions into a plurality of clusters, and
  obtaining a prototype message for each cluster of the plurality of clusters, wherein each prototype message comprises an example message representing the associated cluster;

providing a user interface to view information about the plurality of clusters, the information comprising the prototype message for each cluster of the plurality of clusters;

receiving an input to (i) create a new intent using a first cluster of the plurality of clusters or (ii) move the first cluster of the plurality of clusters to a second intent of the list of intents;

updating the configuration using the received input;

updating the intent classifier by retraining the intent classifier using the updated configuration and the usage data;

deploying the natural language interface using the updated intent classifier.

18. The one or more non-transitory computer-readable media of claim 17, wherein the configuration comprises hierarchical information for the list of intents.

19. The one or more non-transitory computer-readable media of claim 18, wherein the actions comprise:
  receiving an input to modify the hierarchical information relating to the list of intents; and
  updating the configuration using the input to modify the hierarchical information relating to the list of intents.

20. The one or more non-transitory computer-readable media of claim 18, wherein the actions comprise:
  presenting a suggestion for modifying the hierarchical information for the list of intents.

21. The one or more non-transitory computer-readable media of claim 17, wherein the plurality of seed messages for intent are extracted from existing logs of customer support sessions or created by a person.

22. The one or more non-transitory computer-readable media of claim 17, wherein the actions comprise:
   testing the updated intent classifier by obtaining classification results with the updated intent classifier on a corpus of messages.

* * * * *

UNITED STATES PATENT AND TRADEMARK OFFICE
CERTIFICATE OF CORRECTION

PATENT NO.         : 10,210,244 B1                                          Page 1 of 1
APPLICATION NO.    : 15/894504
DATED              : February 19, 2019
INVENTOR(S)        : Satchuthananthavale Rasiah Kuhan Branavan et al.

It is certified that error appears in the above-identified patent and that said Letters Patent is hereby corrected as shown below:

On the Title Page

Item (56), in Column 2, under "Other Publications", Line 2, delete "scikit-learmorg" and insert -- scikit-learn.org --, therefor.

In the Drawings

On sheet 11 of 13, in Figure 11, reference numeral 1165, Lines 1-2, delete "the the" and insert -- the --, therefor.

Signed and Sealed this
Second Day of June, 2020

Andrei Iancu
*Director of the United States Patent and Trademark Office*